Oct. 5, 1948.  A. CASCIA  2,450,782
BLIND-LIKE SHADE
Filed Nov. 23, 1944  2 Sheets-Sheet 2
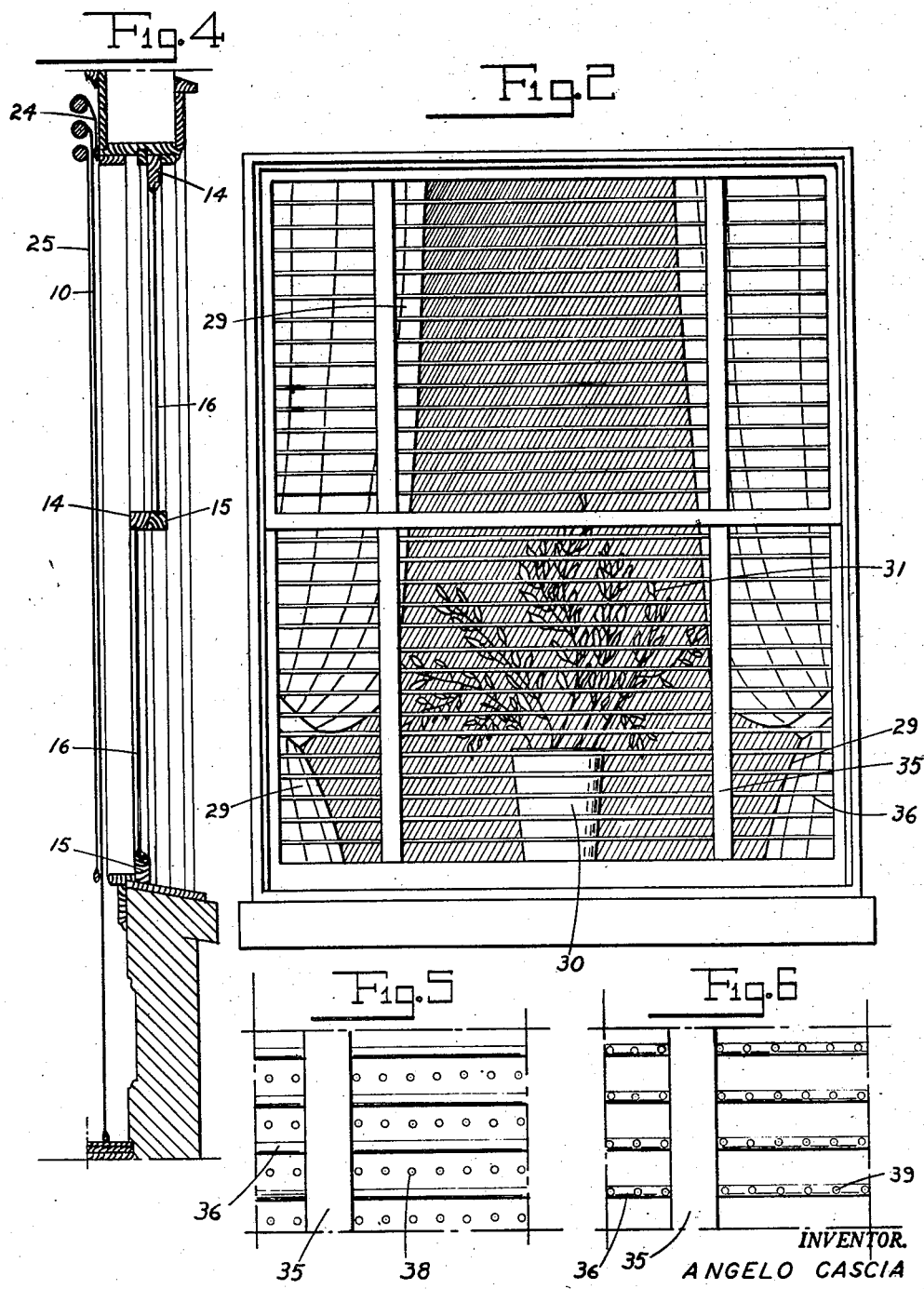
INVENTOR.
ANGELO CASCIA
BY H. M. Kilpatrick
ATTORNEY Patented Oct. 5, 1948

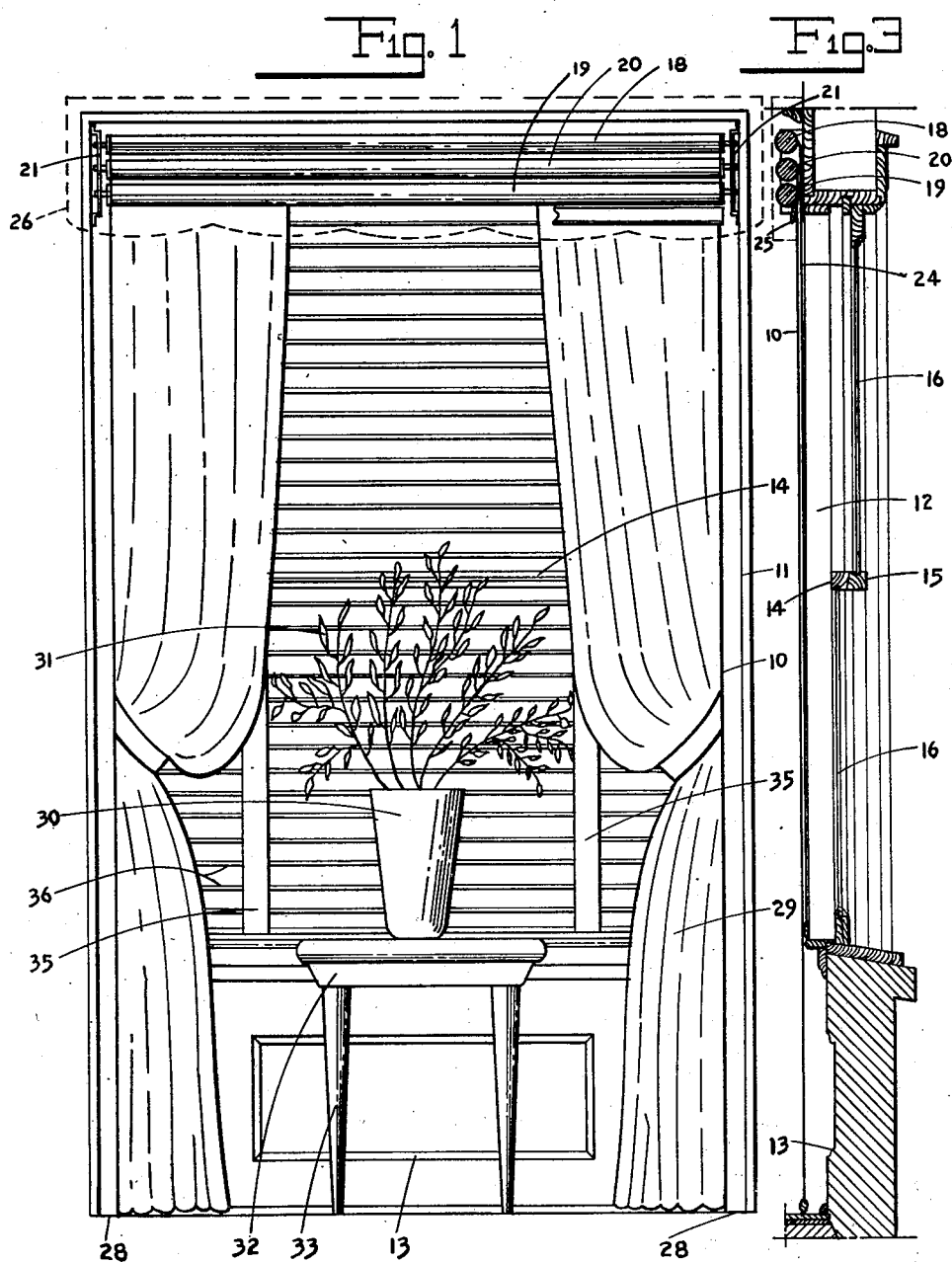

2,450,782

UNITED STATES PATENT OFFICE 2,450,782

BLINDLIKE SHADE

Angelo Cascia, Bronx, N. Y.

Application November 23, 1944, Serial No. 564,780

19 Claims. (Cl. 160—120)

This invention relates to simulations of Venetian blinds, and to window shades and more particularly to window shades simulating Venetian blinds though it is noted that in some of the claims the invention is not limited to Venetian blind simulations.

One object of the invention is to provide a simulation of this kind which when desired, allows a view from the interior of the room to the exterior, or vice versa which is substantially identical with that through a real Venetian blind with the slats horizontal.

Other objects of the invention are to provide an improved simulation of this kind which is adapted to simulate the Venetian blind closed, and is adapted to simulate the appearance of the closed Venetian blind when viewed from the inside and is adapted to simulate the closed Venetian blind when viewed from the outside, or the inside or both.

Other objects are to provide a simulation of the kind stated which is adapted to allow the ventilation through the shade, and to prevent the passage of light rays harmful to the eyes and the furniture and to provide a shade transparent in parts which has thereon simulations of a Venetian blind, curtain, draperies, flowers in a vase, and/or other objects such as are associated with windows.

Other objects are to eliminate the high cost of Venetian blinds and/or draperies and other objects, while maintaining their artistic appearance.

Additional objects of the invention are to effect simplicity and efficiency in such simulations and to provide an extremely simple simulated Venetian blind which is artistic, convenient and durable in use and reliable in operation, and economical to manufacture and easy to install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a simulated Venetian blind assembly mounted on a window of a room and which will now be in part briefly described and later described completely and in detail. This assembly includes a transparent shade disposable over the window and provided with vertical stripes to simulate tapes of a Venetian blind, and with narrow horizontal stripes to simulate the edge faces of Venetian blind slats; the part of the shade between the stripes being clearly transparent, the entire stripes being, if desired, visible from both the inside and outside the window.

If desired the transparent shade may have thereon also simulations of curtain draperies, a vase of flowers and other objects, the entire vertical stripes to simulate tapes of a Venetian blind, and the entire horizontal stripes to simulate the edge faces of Venetian blind slats being visible from the outside, said simulations of the draperies, and the entire stripes being visible between the stripes from outside the window.

If desired I may provide a shade on the indoors side of the transparent shade having on the outdoor side a somewhat dark color and adapted when pulled down to simulate between the stripes the darkened or somewhat darkened interior of the room, but adapted to exclude vision from the outside.

If desired I may provide an outer shade on the out-door side of the transparent shade having its indoor face of a color to simulate the wide faces of the blind slats, the narrow stripes being darker than this outer shade to simulate the lower edge of approximately vertically turned slats.

If desired said transparent shade may be provided with ventilating openings of suitable size, shape and location.

As will appear from the above, it is noted that the transparent shade with the slate-and-tape-simulating stripes only may be used alone, or any one, more or all of the above stated additional features may be used with the transparent shade.

In some installations the stripes may be omitted from the transparent shade, the curtain draperies, vase, flowers and/or other objects thereon being retained.

In the accompanying drawing, showing by way of example, one of many possible embodiments of the invention, Fig. 1 is an inside elevation showing the complete assembly from the room, with the transparent shade down and both opaque shades up;

Fig. 2 is an outside elevation with the transparent shade down, both opaque shades being up;

Fig. 3 is a transverse vertical central sectional view, partly in elevation, showing the assembly with the transparent shades down, the opaque shade next to the window being down to the sill, and the other up;

Fig. 4 is a similar transverse vertical sectional view, partly in elevation, showing the transparent shade down, the opaque shade next to the window up and the other shade down as far as the window sill; and Figs. 5 and 6 are fragmental front elevations respectively showing different arrangements of perforations in the transparent shade.

My improved blind-like shade 10 (Fig. 1) is shown in combination with the inside facing 11 of the frame 12 (Fig. 3) of a window of a room having a panel 13 below the window, and having window sashes 14, 15 (Figs. 1, 3 and 4) with glass panes 16 therein. In one form of the invention, three spring rollers 18, 19, 20 are mounted in brackets 21 one above the other across the top of the window facing, opaque shades 24, 25 (Figs. 3 and 4) later to be described being mounted on the upper and lower rollers 18 and 19 respectively. If desired a valance 26 may be mounted on the adjacent wall for hiding the rollers.

The intermediate shade 10 is of clearly transparent plastic such as Lucite or other transparent or eye-soothing light filtering material or suitable metal or textile netting material reinforced at the edges by folding over the margins and adhering or securing them to the body of the material or in any other suitable manner and mounted on the intermediate roller 26 and disposable between the two opaque shades and extendable substantially to the floor 28 and having stamped or otherwise applied, on the room-side face, or visible from the room-side, opaque simulations of fabric side curtain draperies 29 extending from top to bottom of the side margins of the transparent shade 10 and therebetween with a simulation of a vase 30 of flowers 31 resting at the window sill height on a table 32 stamped on the transparent shade and having legs 33 extending to the floor when the shade is lowered to the floor.

This transparent shade is provided with wide vertical stripes 35 near the side margins of the transparent shade to simulate the tapes of a Venetian blind, and from top to bottom of the window with narrow horizontal stripes 36 extending from side edge to side edge to simulate the edge faces of Venetian blind slats.

These stripes 35, 36 are opaque and may be applied on the shade face facing out-doors (Fig. 2) as the vase, flower and draperies simulations must not show to the outside through the tape-and-slat-simulating stripes, but must show between the stripes.

The tape-and-slat-simulating stripes 35, 36 must show to the inside, between the vase, draperies and flowers; but the draperies, vase and flowers simulations 29, 30, 31 must be opaque, as the tape-and-slat simulations must not show through them to the inside of the room.

The part of the transparent shade 10 away from the simulations 29, 30, 31, 32, 33 and stripes 35, 36 is clearly transparent, whereby when the opaque shades are both fully raised, the transparent part is practically invisible, leaving all out-door objects and said panel 13 visible through the transparent parts of shade, while the narrow stripes appear to be the edge faces of blind slats turned horizontally.

Said stripes 35, 36 and simulations 29, 30, 31 (between the stripes) are visible from outside the window, as the continuations of these stripes are stamped or otherwise provided on the out-doors side of the transparent shade over the view of the simulations 29, 30, 31, thereby to simulate on the out-doors side, the slats and tapes with the draperies behind them.

When it is desired that persons out-doors shall not see into the room, one of the opaque shades 24 or 25 is lowered to the window sill.

The in-door face of the opaque shade 24 on the out-doors side of the transparent shade (that is between the transparent shade and the window) may be of a color to simulate the wide faces of the blind slats and enough lighter in color than the narrow stripes to cause this outer shade when only it and the transparent shade are pulled down, as in Fig. 3, to simulate to persons in the room, the wide faces of the slats when turned approximately vertically, the narrow stripes being enough darker than outer shade to simulate the lower edges of approximately vertically turned slats. The outer face of the outer opaque shade 24 may if desired, be plain or stamped with any design or to simulate a Venetian blind with slats closed substantially vertical.

The opaque shade 25 on the in-doors side of the transparent shade may have on the face facing out-doors a somewhat dark color adapted when the shade is lowered (as in Fig. 3) and viewed between the stripes 35, 36 from the outside to simulate the more or less darkened interior of the room, as compared with the exterior, as it would appear to persons on the outside when real Venetian blind slats are turned horizontally. The in-door side of this opaque shade 25 may be plain or provided with any desired design or provided with a design simulating a Venetian blind with the slats closed.

All or part of said transparent shade and/or the opaque shades (but preferably only the transparent shade) may be, if desired, provided with ventilating openings such as slots or perforations of any shape or size or small enough to keep out mosquitoes or other insects. The openings 38 may be disposed intermediately of the stripes, as in Fig. 5, the transparency of the material tending to render the openings inconspicuous. Or the openings 39 may be disposed on the stripes as in Fig. 6.

The transparent material may include known light filtering materials to prevent the passage of light rays harmful to the eyes.

The operation of the shade or shades is obvious from the foregoing.

When only the transparent shade is used, it is lowered as it is in Figs. 1 and 2 and in use appears to be merely a Venetian blind with slats horizontal, and/or a pair of curtain draperies and a vase of flowers on a table.

When it is desired that persons shall not see through the transparent shade into the room one of the opaque shades is also lowered. If the good appearance of the shade assembly from the inside of the room, as at night, is the more important, the shade 24 of blind-slat-simulating color is lowered to the level of the window sill. If the appearance of the window from the out-doors is the more important, the shade 25 dark toward the out-doors is lowered.

The invention claimed is:

1. A blind-like shade for the window of a room, said shade being of transparent material provided with narrow horizontal stripes to simulate the edge faces of Venetian blind slats and with wide vertical stripes thereon near the side margins of the shade to simulate the tapes of a Venetian blind; the part of the shade away from the stripes being transparent and therefore practically invisible, the narrow stripes appearing to be the edge faces of blind slats turned horizontally.

2. A transparent shade disposable over a window and provided with vertical stripes to simulate tapes of a Venetian blind, and with narrow horizontal stripes to simulate the edge faces of Venetian blind slats; the part of the intermediate shade away from the stripes being clearly transparent.

3. A transparent shade as in claim 2, said transparent shade being provided with ventilating openings disposed intermediately of the stripes, the transparency of the material in contrast with the stripes tending to render the openings inconspicuous.

4. A transparent shade as in claim 2, said transparent shade being provided with ventilating openings disposed on the stripes.

5. A combination adapted for use on a window of a room, said combination comprising an outer opaque shade on the window adapted to be raised and lowered; a transparent shade disposable over the opaque shade and provided with vertical stripes, and with narrow horizontal stripes, each shaded to simulate the lower edge face of a Venetian blind slat; the transparent shade away from the simulations and stripes being clearly transparent, whereby when the opaque shade is raised, the narrow stripes appear to be the edge faces of blind slats turned horizontally; the in-door face of the outer opaque shade being of a color to simulate the wide faces of blind slats, and when the outer and transparent shades are lowered, to simulate to people in the room, the wide faces of slats when turned approximately vertically; whereby when said shades are lowered, said outer shade and the horizontal stripes, when viewed simultaneously from the inside, cooperate to place adjacently in the view, a simulation of the wide face of a blind slat and the simulation of the lowered face of the slat, whereby said two simulations cooperate to give a simulation of the complete slat turned vertically.

6. A combination adapted for use on a window of a room, said combination comprising an inner opaque shade on the window adapted to be raised and lowered; a transparent shade disposable over the out-door face of the opaque shade and provided with vertical stripes, and with narrow horizontal stripes, each shaded to simulate the lower edge face of a Venetian blind slat; whereby when the opaque shade is raised, the narrow stripes appear to be the edge faces of blind slats turned horizontally; the inner opaque shade on the in-doors side of the transparent shade having on its out-door face a dark color adapted when the inner and transparent shades are lowered to be viewed between the stripes from the outside to simulate the more or less darkened interior of the room, as compared with the exterior; whereby the inner and transparent shades when simultaneously viewed from the outside, cooperate to give to the eye on the outside the appearance of a window opening having therein a real Venetian blind with the blind slats turned horizontally.

7. A combination adapted for use on a window of a room, said combination comprising inner and outer opaque shades disposable on the window and adapted to be raised and lowered; an intermediate shade of transparent material disposable between the opaque shades and provided with horizontal stripes, each shaded to simulate the lower edge face of a Venetian blind slat; the inner opaque shade on the in-doors side of the transparent shade having on its out-door face a dark color adapted when only the inner and intermediate shades are lowered to be viewed between the stripes from the outside to simulate the more or less darkened interior of the room; the indoor face of the opaque shade on the out-doors side of the transparent shade being of a color to simulate the wide faces of the blind slats; manipulation of the opaque shades causing the latter to cooperate with the transparent shade to change, from exterior-view transmission and a simulation of open horizontal slats, to a view-excluding combination in which the transparent shade cooperates with an opaque shade to simulate a Venetian blind to provide on the inside, when only the transparent and outer shades are down, a simulation of closed vertical slats, and on the outside, when only the transparent and inner shades are down, a simulation of open horizontal slats.

8. A transparent intermediate shade adapted for use on a window of a room, between a blind-slat colored outer opaque shade and a room-darkness simulating inner opaque shade disposed on the window and adapted to be raised and lowered; the intermediate shade being provided with vertical stripes thereon and with narrow horizontal stripes, each shaded to simulate the lower edge face of a Venetian blind slat, whereby when both opaque shades are raised, the narrow stripes appear to be the lower curved edge face of blind slats turned horizontally; the dark color of the inner shade being adapted when only the inner and intermediate shades are lowered to be viewed between the stripes from the outside to simulate the darkened interior of the room, thereby to simulate the appearance of a window opening having therein a real Venetian blind with slats horizontal; the transparent shade and the blind-slat colored outer shade, when only they are lowered cooperating to simulate, to people in the room, complete slats when turned approximately vertically.

9. A transparent shade adapted for use on a window of a room between said windows and a dark-colored inner opaque shade between the window and the transparent shade both shades being adapted to be raised and lowered on the window; said transparent shade having stamped, on the room-side face, simulations of fabric side curtain draperies at the side margins of the transparent shade; the out-door face of the transparent shade having stamped thereon from top to bottom of the window wide vertical stripes near the side edges of the transparent shade to simulate the tapes of a Venetian blind, and from side to side of the window narrow horizontal stripes each shaded to simulate the lower edge face of a Venetian slat; the transparent shade when both shades are down being adapted to allow a view of the dark color of the inner shade, whereby the shades cooperate to simulate horizontally turned slats of a blind over a window of a darkened room, said stripes hiding from the out-side the fabric simulations covered thereby at the same time that the drapery simulations hide from the interior the stripes covered thereby; whereby the structures of the transparent shade, the stripes and said fabric simulations all cooperate simultaneously to simultaneously simulate from the interior and exterior side draperies disposed over margins of a Venetian blind with the slats turned horizontally.

10. A shade for use with a window, said shade being of clearly transparent material adapted to filter out light harmful to the eyes and extendable substantially to the floor and having stamped, on the room-side face, simulations of fabric side curtain draperies extending from top to bottom of the side margins of the transparent shade and therebetween with a simulation of a vase of flowers resting at window sill height on a table stamped on the transparent shade and having legs extending to the floor, the transparent shade having stamped on its out-door face wide vertical strips thereon near the side edges of the transparent shade to simulate the tapes of a Venetian blind, and extending from side to side shaded narrow horizontal stripes to simulate the edge faces of Venetian blind slats.

11. A combination adapted for use on a window of a room, said combination comprising an outer opaque shade adapted to be raised and lowered on the window; a transparent shade disposable over the opaque shade and provided with narrow horizontal stripes, each shaded to simulate the lower edge face of a blind slat; the in-door face of the outer shade being of a color to simulate the wide faces of the blind slats and adapted to cooperate with the narrow stripes to simulate complete slats turned vertically; whereby the outer shade may be manipulated to exclude view-transmission and to cooperate with the transparent shade to present the simulation of a Venetian blind on the inside and simultaneously present a Venetian blind simulation on the outside.

12. A transparent shade adapted for use on a window of a room over an outer opaque shade of blind-slat simulating color and adapted to be raised and lowered, said transparent shade having stamped on the room-side face, simulations of fabric side curtain draperies; the out-door face of the transparent shade having stamped thereon narrow horizontal stripes extending from side to side of the shade, each shaded to simulate the lower edge face of a Venetian blind slat; the transparent shade having therein small insect-excluding perforations; narrow stripes of the transparent shade, when both shades are down, being adapted to cooperate with the blind-simulating color to simulate complete slats turned vertically.

13. In combination, a transparent shade disposable over a window and provided with vertical stripes to simulate tapes of a Venetian blind; and with narrow horizontal stripes to simulate the edge faces of Venetian blind slats; the part of the intermediate shade away from the stripes being clearly transparent; and a shade on the in-doors side of the transparent shade having on the out-door side a somewhat dark color.

14. In combination, a transparent shade disposable over a window and provided with vertical stripes to simulate tapes of a Venetian blind; and with narrow horizontal stripes to simulate the edge faces of Venetian blind slats; the part of the intermediate shade away from the stripes being clearly transparent; and an outer shade on the out-door side of the transparent shade having its indoor face of a color to simulate the wide faces of the blind slats, the narrow stripes being darker than said outer shade to simulate the lower edges of approximately vertically turned slats.

15. In combination a transparent shade disposable over a window and provided with simulations of side curtain draperies; said shade having stripes to simulate tapes of a Venetian blind, and narrow horizontal stripes to simulate the edge faces of Venetian blind slats; the part of the intermediate shade away from the simulations and stripes being clearly transparent, the entire stripes being visible from outside the window, the stripes between the draperies being visible from both inside and outside the window.

16. A shade for use with a window, said shade being of clearly transparent material and extendable substantially to the floor and having stamped on the room-side face, simulations of fabric side-curtain draperies extending from top to bottom of the side margins of the shade and therebetween with a simulation of a vase of flowers resting on a table; the transparent shade having stamped, on its out-door face, wide vertical stripes thereon near the side edges of the transparent shade to simulate the tapes of a Venetian blind, and narrow horizontal stripes extending from side to side and shaded to simulate the edge faces of Venetian blind slats.

17. A shade for use with a window, said shade being of clearly transparent material and extendable substantially to the floor and having stamped on the room-side face, simulations of fabric side-curtain draperies extending from top to bottom of the side margins of the transparent shade and therebetween with a simulation of a vase of flowers resting on a table, the transparent shade having stamped, on its out-door face, wide vertical stripes thereon near the side edges of the transparent shade to simulate the tapes of a Venetian blind, and narrow horizontal stripes extending from side to side and shaded to simulate the edge faces of Venetian blind slats; the part of the shade away from the simulations and stripes being clearly transparent, the transparent part being practically invisible, and said panel being visible through the transparent shade and the narrow stripes appearing to be the edge faces of blind slats turned horizontally; said stripes and simulations being visible from outside the window, continuation stripes being provided on the out-doors side of the transparent shade over the view of the draperies, thereby to simulate on the out-doors side, the slats and tapes with the draperies behind them.

18. In combination an outer shade, an inner shade and an intermediate shade for use with a window, said intermediate shade being of clearly transparent material and extendable substantially to the floor and having stamped on the room-side face, simulations of fabric side-curtain draperies extending from top to bottom of the side margins of the transparent shade and therebetween with a simulation of a vase of flowers resting on a table, the transparent shade having stamped on its out-door face, wide vertical stripes thereon near the side edges of the transparent shade to simulate the tapes of a Venetian blind, and narrow horizontal stripes extending from side to side and shaded to simulate the edge faces of Venetian blind slats, the in-door face of the outer shade on the out-doors side of the transparent shade being of a color to simulate the wide faces of the blind slats and lighter in color than the narrow stripes to cause the outer shade when only the outer and transparent shades are pulled down to simulate to people in the room, the wide faces of the slats when turned approximately vertically.

19. A blind-like shade for the window of a room, said shade being of transparent material provided with narrow horizontal stripes to simulate the edge faces of Venetian blind slats; the part of the shade away from the stripes being transparent and therefore practically invisible, the narrow stripes appearing to be the edge faces of blind slats turned horizontally.

ANGELO CASCIA.

REFERENCES CITED

The following references are of record in the file of this patent:

UNITED STATES PATENTS

| Number | Name | Date |
| --- | --- | --- |
| D. 92,612 | Klau | June 26, 1934 |
| 624,111 | Snow | May 2, 1899 |
| 1,713,989 | Warnick | May 21, 1929 |
| 2,074,482 | Martens | Mar. 23, 1937 |
| 2,247,634 | Houston | July 1, 1941 |
| 2,294,966 | Dreyfus | Sept. 8, 1942 |